US010877855B2

United States Patent
Sun et al.

(10) Patent No.: US 10,877,855 B2
(45) Date of Patent: Dec. 29, 2020

(54) TECHNIQUES FOR DATA BACKUP AND RESTORATION

(71) Applicant: Veritas Technologies LLC, Mountain View, CA (US)

(72) Inventors: Dongxu Sun, Beijing (CN); Cheng Hai Zhu, Beijing (CN); Cheng Shan, Beijing (CN); Haibin She, Beijing (CN); Xianbo Zhang, Plymouth, MN (US)

(73) Assignee: Veritas Technologies LLC, Mountain View, CA (US)

( * ) Notice: Subject to any disclaimer, the term of this patent is extended or adjusted under 35 U.S.C. 154(b) by 794 days.

(21) Appl. No.: 14/577,429

(22) Filed: Dec. 19, 2014

(65) Prior Publication Data

US 2016/0179631 A1 Jun. 23, 2016

(51) Int. Cl.
*G06F 16/30* (2019.01)
*G06F 11/14* (2006.01)

(52) U.S. Cl.
CPC ...... *G06F 11/1471* (2013.01); *G06F 11/1448* (2013.01); *G06F 11/1469* (2013.01); *G06F 2201/80* (2013.01)

(58) Field of Classification Search
CPC .............................. G06F 11/1471; G06F 16/30
USPC ............................................................ 707/684
See application file for complete search history.

(56) References Cited

U.S. PATENT DOCUMENTS

| 7,373,364 B1 | 5/2008 | Chapman |
| 8,903,779 B1 | 12/2014 | Holenstein et al. |
| 9,588,847 B1* | 3/2017 | Natanzon ............ G06F 11/1458 |
| 9,679,039 B1* | 6/2017 | Nickurak .......... G06F 17/30575 |
| 2001/0056438 A1* | 12/2001 | Ito ....................... G06F 11/2069 |
| 2006/0031267 A1 | 2/2006 | Lim et al. |
| 2006/0206544 A1 | 9/2006 | Oks et al. |
| 2006/0218205 A1 | 9/2006 | Shimizu et al. |
| 2006/0224636 A1* | 10/2006 | Kathuria ............. G06F 11/1471 |
| 2008/0307255 A1 | 12/2008 | Chen et al. |
| 2010/0198791 A1 | 8/2010 | Wu et al. |
| 2013/0117231 A1 | 5/2013 | Sridharan et al. |

(Continued)

FOREIGN PATENT DOCUMENTS

| CN | 103389928 A | 11/2013 |
| CN | 103729264 A | 4/2014 |

OTHER PUBLICATIONS

International Search Report and Written Opinion issued by the U.S. Patent and Trademark Office as International Searching Authority for International Applicaiton No. PCT/US15/65955 dated Feb. 26, 2016 (8 pages).

(Continued)

*Primary Examiner* — Irete F Ehichioya
*Assistant Examiner* — Johnese T Johnson
(74) *Attorney, Agent, or Firm* — Patent Law Works LLP

(57) ABSTRACT

Techniques for data backup and restoration are disclosed. In one embodiment, the techniques may be realized as a method including generating a first backup representing a database at a first time; after the first backup, generating a plurality of journal entries, each journal entry representing a change to the database made after the first time; and restoring the database from the first backup and the plurality of journal entries, the restored database including the changes represented by the entries.

17 Claims, 5 Drawing Sheets

(56) References Cited

U.S. PATENT DOCUMENTS

2014/0006853 A1\* 1/2014 Dudgeon ............ G06F 11/1435
                                                                714/15
2015/0178171 A1\* 6/2015 Bish .................... G06F 11/1451
                                                                714/20
2015/0207673 A1\* 7/2015 Cui ..................... H04L 12/2863
                                                                370/228

OTHER PUBLICATIONS

Extended European Search Report, European Application No. 15870934. 5, dated Oct. 15, 2018, 9 pgs.
CN Office Action for Chinese Application No. 201580074914.5, dated Feb. 26, 2020, 26 pgs.
CN Office Action for Chinese Application No. 201580074914.5, dated Sep. 16, 2020, 28 pages.

\* cited by examiner

TECHNIQUES FOR DATA BACKUP AND RESTORATION

FIELD OF THE DISCLOSURE

The present disclosure relates generally to data backup and, more particularly, to techniques for data backup and restoration.

BACKGROUND OF THE DISCLOSURE

Modern computer databases can be large and valuable resources for a variety of enterprises. Various data loss prevention procedures, particularly backup systems, are designed to preserve databases even in the event of local corruption or compromise.

Systems which generate full database "snapshots" typically only do so periodically. After a snapshot is taken, it is possible for many changes to accumulate which may be lost if the next snapshot is later destroyed or corrupted.

In view of the foregoing, it may be understood that there may be significant problems and shortcomings associated with traditional data backup and restoration technologies.

SUMMARY OF THE DISCLOSURE

Techniques for data backup and restoration are disclosed. In one embodiment, the techniques may be realized as a method comprising the steps of generating a first backup representing a database at a first time; after the first backup, generating a plurality of journal entries, each journal entry representing a change to the database made after the first time; and restoring the database from the first backup and the plurality of journal entries, the restored database including the changes represented by the entries.

In accordance with other aspects of this embodiment, the method further includes, after the first backup, generating a second backup representing a database at a second time; wherein the second backup is not used to restore the database.

In accordance with further aspects of this embodiment, the method further includes identifying a compromising event at a time between the first time and the second time; and determining not to use the second backup to restore the database based on the compromising event prior to the second time.

In accordance with further aspects of this embodiment, the method further includes detecting a flaw in the second backup; and determining not to use the second backup to restore the database based on the flaw.

In accordance with further aspects of this embodiment, detecting the flaw may include comparing the second backup against metadata recorded about the second backup.

In accordance with further aspects of this embodiment, detecting the flaw may include identifying a failed attempt to use the second backup to restore the database.

In accordance with further aspects of this embodiment, at least one of the plurality of journal entries may represent a change to the database before the second time and at least one other of the plurality of journal entries represents a change to the database after the second time.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

A file backup policy includes the periodic creation of backup copies as well as the use of operational journal files to record individual changes made between backup copies. Use of the journal entries in conjunction with the backup copies allows for robust restoration of primary files even if one or more of the backup copies is corrupt or otherwise compromised.

Figure 1:
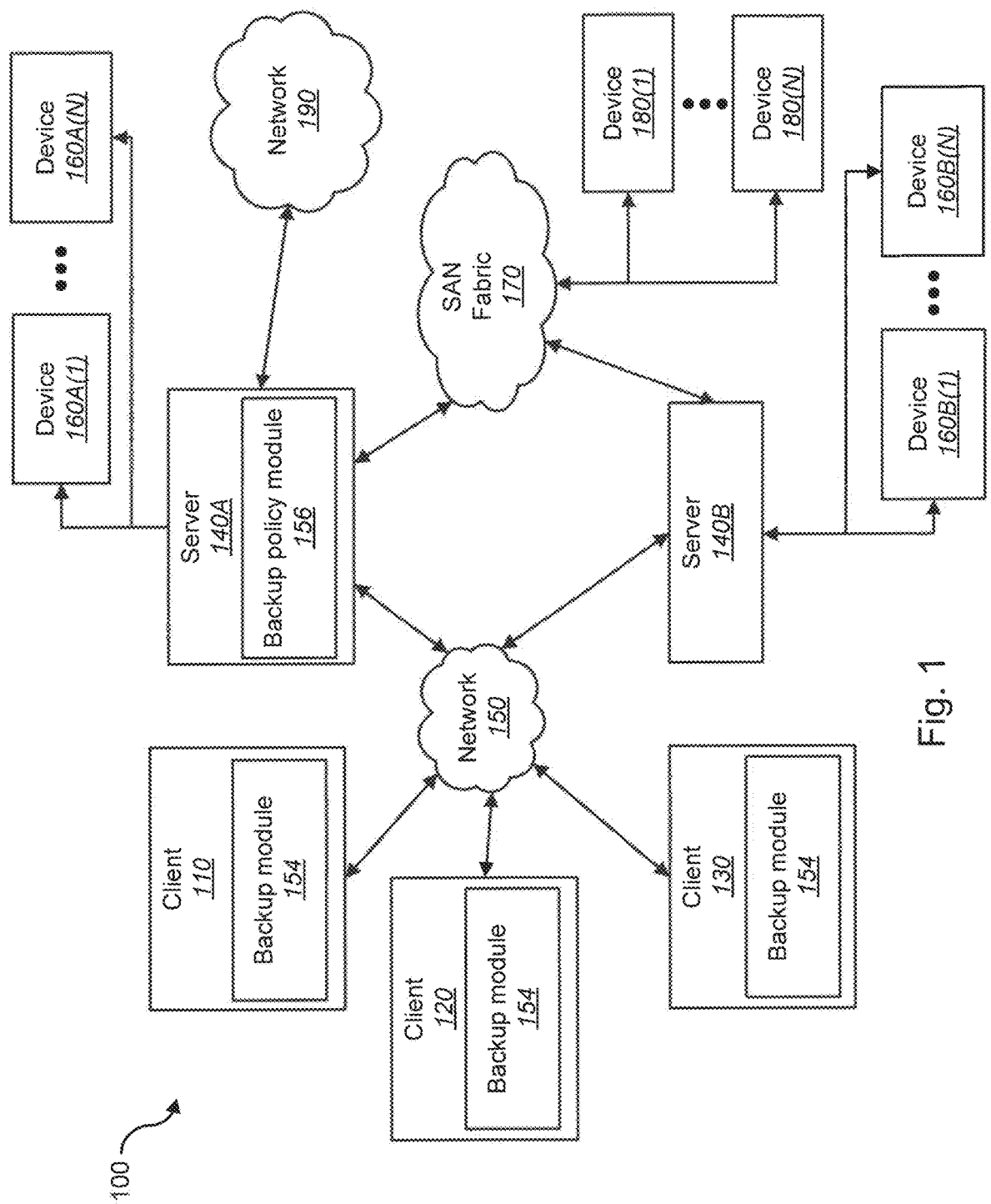
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
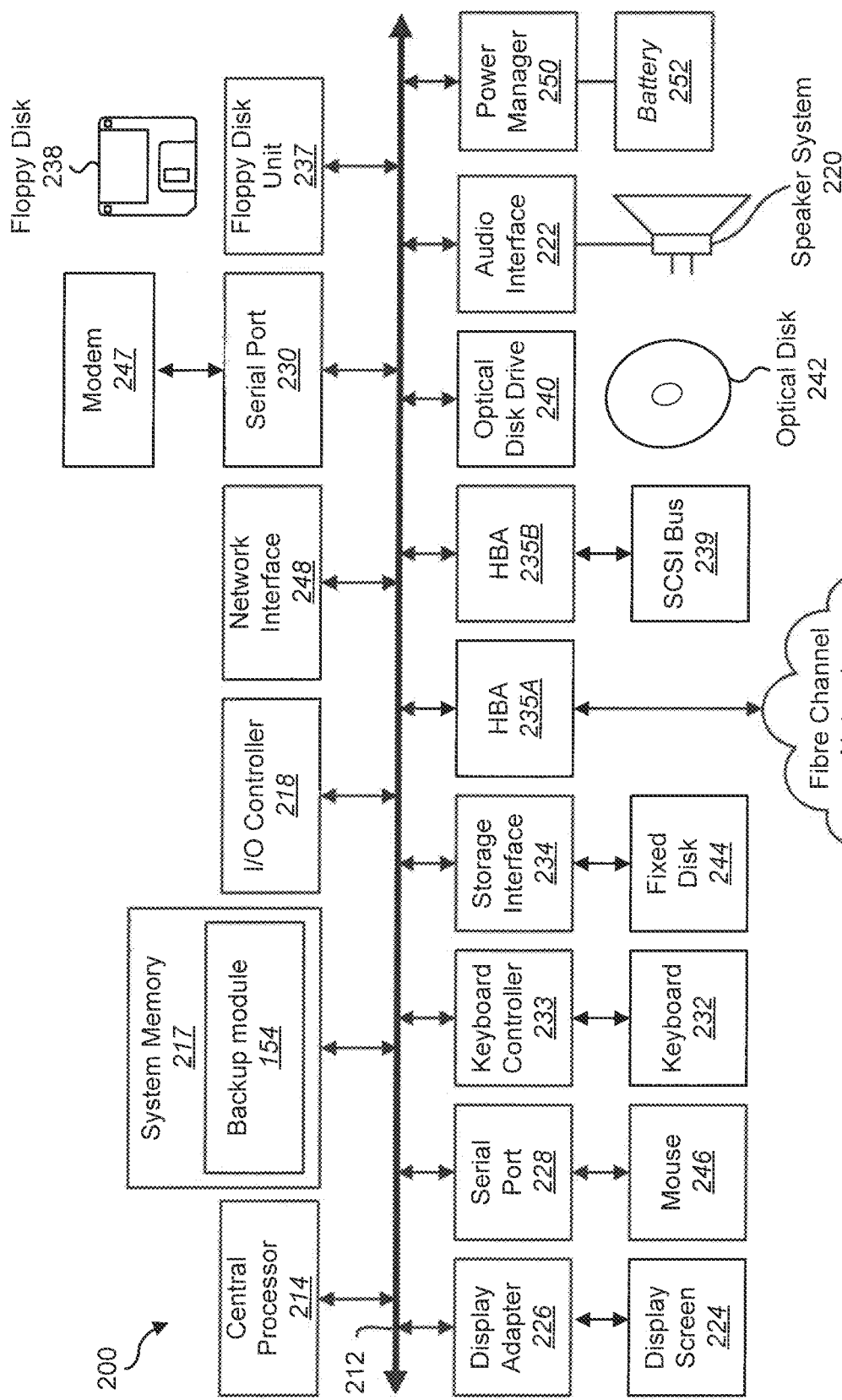
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of secure applications such as, for example, backup module 154, while server 140A may include one or more portions such as, for example, backup policy module 156. Further, one or more portions of the backup module 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including backup module 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, backup module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
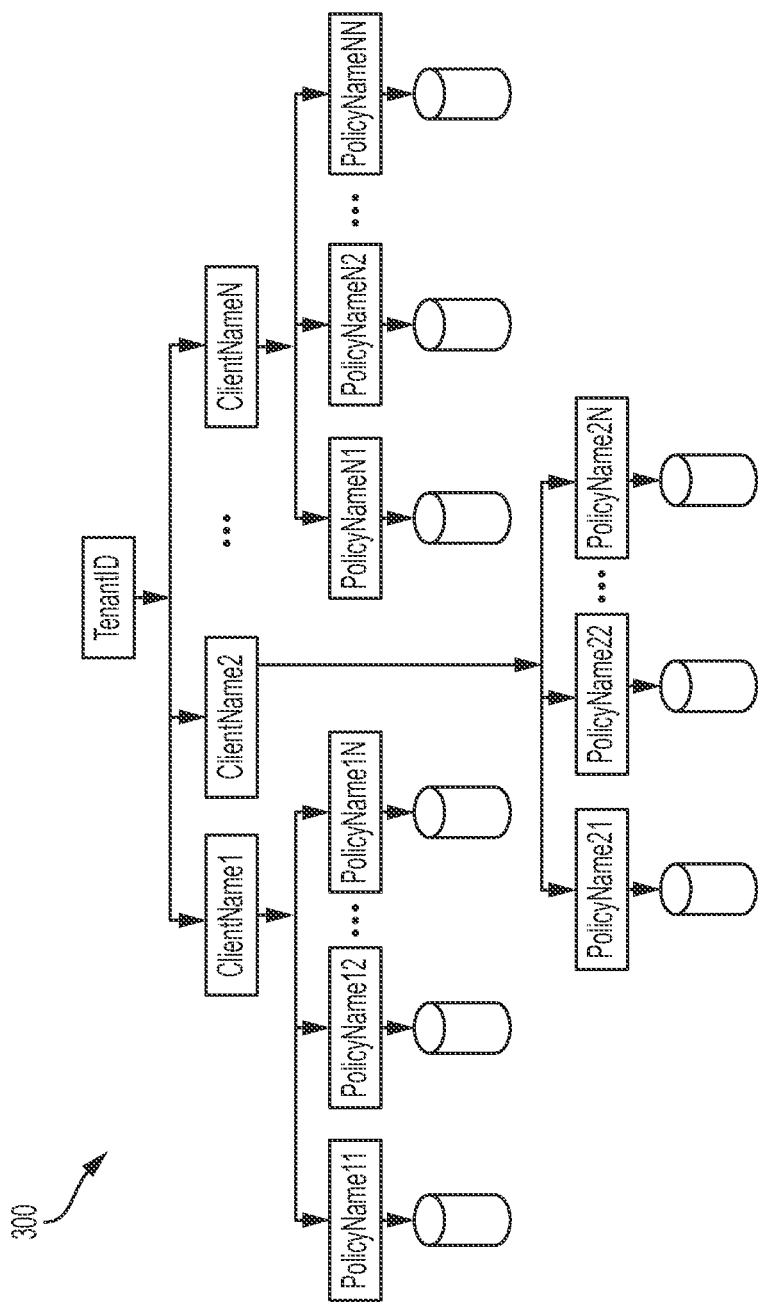
FIG. 3 shows a block diagram illustrating a hierarchical directory system for backup policies in accordance with an embodiment of the present disclosure.

In some implementations, the backup module 154 may be configured to identify and backup files that are stored and modified on the client device 110, according to policies set and controlled by the backup policy module 156. FIG. 3 shows an exemplary hierarchy 300 of policies associated with a particular system. The hierarchy 300 may be configured, for each client device, to match the file hierarchy for one or more directories of files that are to be backed up according to policies maintained by the backup and policy modules 154, 156. Each file that is to be backed up in each directory may have a corresponding backup policy in a corresponding directory, as illustrated in FIG. 3.

Figure 4:
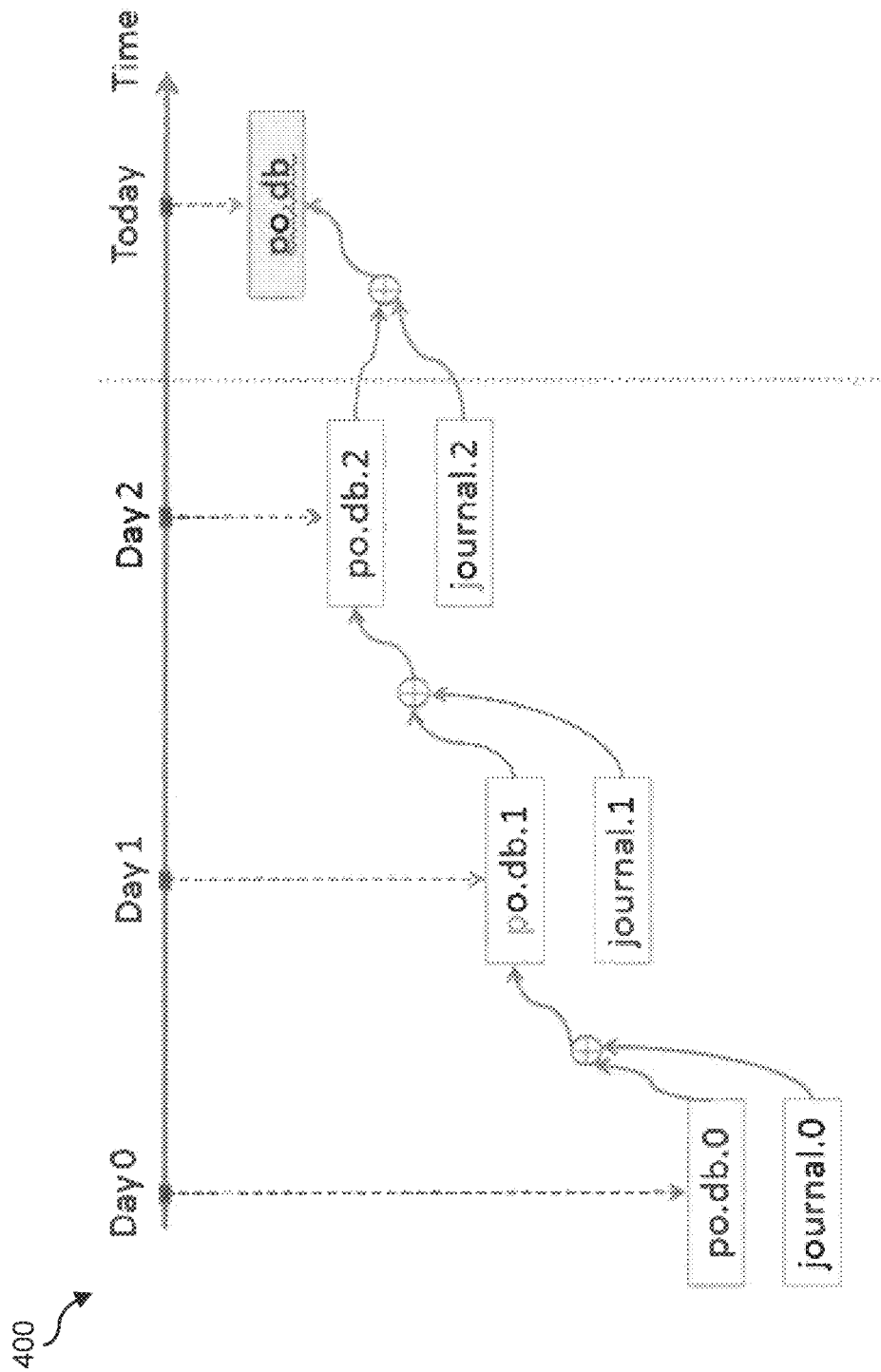
FIG. 4 shows a timeline representing file backup events in accordance with an embodiment of the present disclosure.

A database file associated with a backup policy may be backed up as illustrated in FIG. 4, which is a timeline 400 representing an exemplary backup methodology. The methodology may involve, for each database file that is to be backed up, creating a backup copy at established policy intervals and recording an operational journal representing any changes to the database subsequent to each backup copy. As shown in FIG. 4, a first backup copy po.db.0 is made of the database on Day 0 along with an operational journal, journal.0. Each time an operation is performed on the database after the point that po.db.0 and journal.0 are first made, the operation is recorded as a journal entry in journal.0. On Day 1, a second copy po.db.1 is made along with a new journal, journal.1. Changes made after po.db.1 and journal.1 are generated are recorded in journal.1. A third copy and journal, po.db.2 and journal.2, are made on Day 3. A fourth copy po.db is subsequently made.

As an example of the operation of the system based on the timeline 400, consider that the fourth database copy po.db is corrupted and cannot be used in a restore attempt. Because of the redundant nature of the backup copies with the operational journals, it is still possible to restore the file to the point when the po.db backup was made by using the po.db.2 backup copy and the journal.2 operational journal. The database is restored to the state recorded by the po.db.2 backup copy, and then journal entries recorded in journal.2 are applied in order, resulting in a restoration of the current database.

Figure 5:
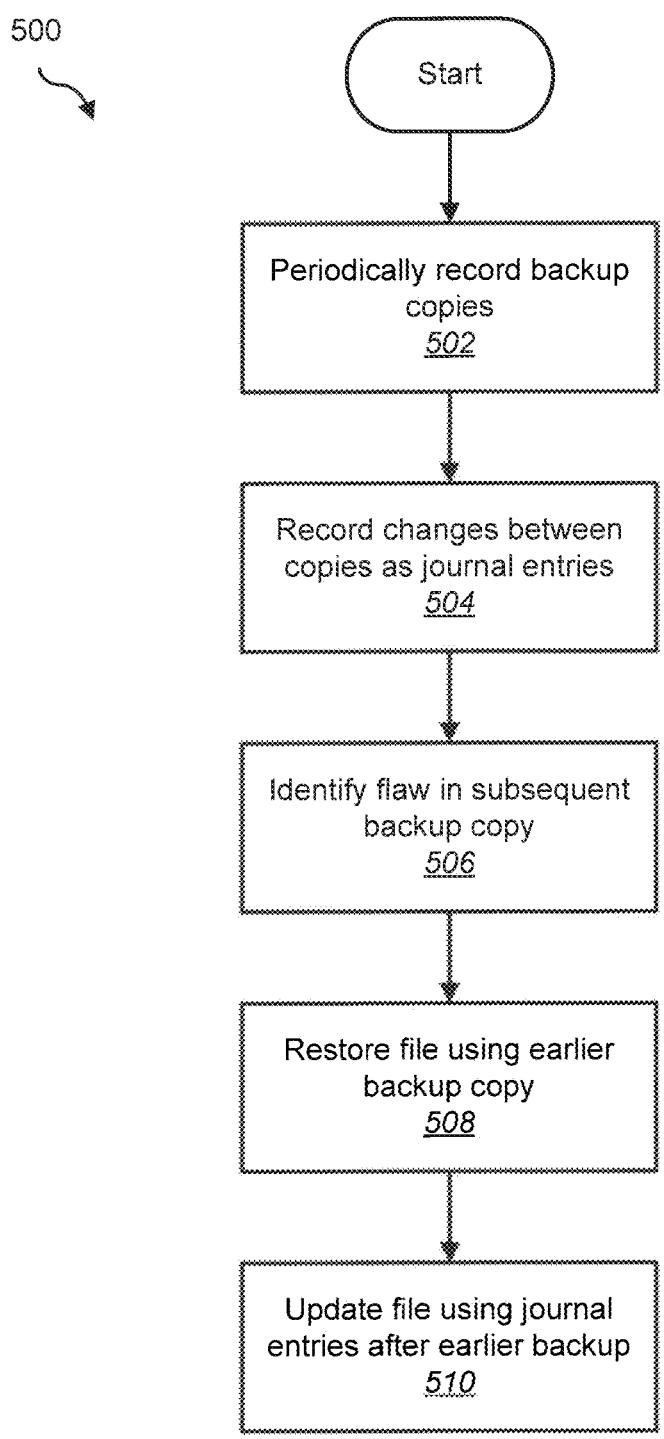
FIG. 5 shows a method for file backup and restoration in accordance with an embodiment of the present disclosure.

FIG. 5 illustrates a method 500 for file backup and restoration. The backup system makes periodic backup copies of a file according to a backup policy associated with that file (502). As described above, the backup copies may be placed in a shadow directory as part of a file hierarchy located on the backup server or other backup medium. Each shadow directory may include both the backup copies and the operational journals associated with the same directory in the primary system.

In addition to the periodic backup copies, the system keeps an operational journal which includes a record of each operation or change made to the file subsequent to each particular backup (504). Typically each journal is associated with a particular backup copy and records operational changes that occurred between its associated backup and the next backup.

It will be understood that each backup copy and associated journal file may only be kept for a limited period of time, which may depend on the backup policy associated with a particular file or a more general system policy for backups. For example, in some implementations, only the most recent five periodic backup copies are retained—after a sixth backup copy is made, the oldest existing backup is discarded. Older backups may sometimes be maintained for archival purposes, and in any event such a policy will depend on the specific role that the backup process plays in data retention within a particular information system.

The next steps of the method 500 may come into play, for instance, if the primary file is found to be corrupted and a flaw is detected in the most recent backup copy (506). In some implementations, checksums and metadata may be recorded at the time each backup is made and, when a restoration occurs, may be compared against the file to be certain that it's uncompromised. One or more backups may occur even after a system is compromised if the compromising event is not identified immediately, and those backups after the event are as compromised as the primary file.

The existence of the operational journals allows for an updated restoration of the file even past the point of the most recent valid backup. The file can be restored using the earlier backup copy (508), presumably the last one that can be confirmed to be clean and uncorrupted. Then the journal entries made after that backup can be applied to the file in order to update the file from its earlier backed-up state (510). In some implementations, multiple journals may be consulted where changes were made across one or more backup events associated with compromised or corrupted backup copies. The journals therefore provide a fully redundant record of file changes that allows for a secondary method of restoration supplementing the backup copies themselves.

At this point it should be noted that techniques for file backup and restoration in accordance with the present disclosure as described above may involve the processing of input data and the generation of output data to some extent.

This input data processing and output data generation may be implemented in hardware or software. For example, specific electronic components may be employed in backup module, policy module, or similar or related circuitry for implementing the functions associated with file backup and restoration in accordance with the present disclosure as described above. Alternatively, one or more processors operating in accordance with instructions may implement the functions associated with file backup and restoration in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method of backing up a database and performing a database restoration comprising:
   generating a first backup representing a database at a first point in time;
   after the first backup, generating an operational journal including a plurality of journal entries tracking changes in the database to form a record of file changes at a point in time past the first backup;
   generating a second backup, after the first backup, at a second point in time;
   updating the plurality of journal entries of the operational journal, after the first point in time, to include at least one journal entry representing a change to the database before the second point in time and at least one other journal entry represents a change to the database after the second point in time; and
   restoring the database at a point in time equal to or greater than the second point in time including:
   determining whether the second backup is valid;
   in response to a determination that the second backup is valid, restoring the database based on the second backup; and
   in response to a determination that the second backup is invalid, applying the changes represented by the plurality of journal entries to update the first backup to generate an updated restoration of the first backup reflecting at least one of the changes recorded in the operational journal after the first point in time;
   wherein the journal entries are used to perform a secondary form of restoration of the database in the event the second backup is invalid.

2. The method of claim 1,
   wherein the second backup is not used to restore the database in response to determining the second backup is compromised or flawed.

3. The method of claim 2, further comprising:
   identifying a compromising event at a point in time between the first point in time and the second point in time; and
   determining not to use the second backup to restore the database based on the compromising event prior to the second point in time.

4. The method of claim 2, further comprising:
   detecting a flaw in the second backup; and
   determining not to use the second backup to restore the database based on the flaw.

5. The method of claim 4, wherein detecting the flaw comprises comparing the second backup against metadata recorded about the second backup.

6. The method of claim 4, wherein detecting the flaw comprises identifying a failed attempt to use the second backup to restore the database.

7. At least one non-transitory processor readable storage medium storing a computer program of instructions configured to be readable by at least one processor for instructing the at least one processor to execute a computer process for performing the method as recited in claim 1.

8. An article of manufacture to back up a database and perform a database restoration comprising:
   at least one processor readable storage medium; and instructions stored on the at least one medium;
   wherein the instructions are configured to be readable from the at least one medium by at least one processor and thereby cause the at least one processor to operate so as to:
   generate a first backup representing a database at a first point in time;
   after the first backup, generate an operational journal including a plurality of journal entries, tracking changes in the database to form a record of file changes at a point in time past the first backup;
   generate a second backup, after the first backup, at a second point in time;
   update the plurality of journal entries of the operational journal, after the first point in time, to include at least one journal entry representing a change to the database before the second point in time and at least one other journal entry represents a change to the database after the second point in time; and
   restore the database, at a point in time equal to or greater than the second point in time including:
   determining whether the second backup is valid;
   in response to a determination that the second backup is valid, restoring the database based on the second backup; and
   in response to a determination that the second backup is invalid, applying the changes represented by the plurality of journal entries to update the first backup to generate an updated restoration of the first backup reflecting at least one of the changes recorded in the operational journal after the first point in time;
   wherein the journal entries are used to perform a secondary form of restoration of the database in the event the second backup is invalid.

9. The article of claim 8, wherein the second backup is not used to restore the database in response to determining the second backup is compromised or flawed.

10. The article of claim 9, the at least one processor further operable to:

identify a compromising event at a point in time between the first point in time and the second point in time; and
determine not to use the second backup to restore the database based on the compromising event prior to the second point in time.

11. The article of claim 9, the at least one processor further operable to:
detect a flaw in the second backup; and
determine not to use the second backup to restore the database based on the flaw.

12. The article of claim 11, wherein detecting the flaw comprises comparing the second backup against metadata recorded about the second backup.

13. The article of claim 11, wherein detecting the flaw comprises identifying a failed attempt to use the second backup to restore the database.

14. A system to back up a database and perform a database restoration comprising:
one or more processors communicatively coupled to a network; wherein the one or more processors are configured to:
generate a first backup representing a database at a first time;
after the first backup, generate an operational journal including a plurality of journal entries, tracking changes in the database to form a record of file changes at a point in time past the first backup;
generate a second backup, after the first backup, at a second point in time;
update the plurality of journal entries of the operational journal, after the first point in time, to include at least one journal entry representing a change to the database before the second point in time and at least one other journal entry represents a change to the database after the second point in time; and
restore the database, at a point in time equal to or greater than the second point in time, which includes:
determine whether the second backup is valid;
in response to a determination that the second backup is valid, restoring the database based on the second backup; and
in response to a determination that the second backup is invalid, applying the changes represented by the plurality of journal entries to update the first backup and generate an updated restoration of the database reflecting at least one of the changes recorded in the operational journal after the first point in time;
wherein the journal entries are used to perform a secondary form of restoration of the database in the event the second backup is invalid.

15. The system of claim 14, wherein the second backup is not used to restore the database in response to determining the second backup is compromised or flawed.

16. The system of claim 15, the one or more processors configured to:
identify a compromising event at a point in time between the first point in time and the second point in time; and
determine not to use the second backup to restore the database based on the compromising event prior to the second point in time.

17. The system of claim 15, the one or more processors configured to:
detect a flaw in the second backup; and
determine not to use the second backup to restore the database based on the flaw.

* * * * *